Oct. 28, 1958 J. D. RECTOR 2,858,433
RATE LIMITING CIRCUIT
Filed Feb. 27, 1956
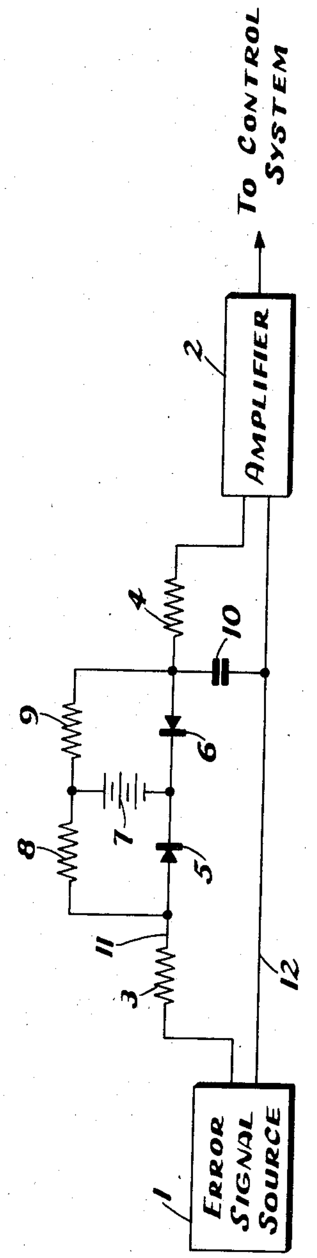
INVENTOR.
JACK D. RECTOR
BY Moody and Harsha
ATTORNEYS

United States Patent Office 2,858,433

Patented Oct. 28, 1958

2,858,433

RATE LIMITING CIRCUIT

Jack D. Rector, Cedar Rapids, Iowa, assignor to Collins Radio Company, Cedar Rapids, Iowa, a corporation of Iowa Application February 27, 1956, Serial No. 567,993

1 Claim. (Cl. 250—27)

This invention pertains to rate limiting electrical circuits that limit the rate of change of an applied electrical signal.

In various remote positioning apparatus, if the rate of signal change from a sensing or pickup element is higher than a particular required value, a remotely controlled system may be subject to undesirable erratic control. When a pickup is very sensitive, an undesired high rate of signal change is often derived from noise such as electronic shot effect, from pickup caused by vibration at the sensing station, or from any electrical pickup derived from undesirable electromagnetic fields surrounding the signal circuits.

An object of the present invention is to provide a simple circuit arrangement for limiting the rate of change of the control signal.

In the single illustration, a schematic diagram of the rate limiting circuit is shown connected between an error signal source 1 and an amplifier 2. The internal resistances of the source and the amplifier are represented by resistors 3 and 4, respectively. The rate limiting device includes two diodes 5 and 6 that are serially connected with respect to signal current but mutually reversed, a source 7 of constant current for biasing the diodes, and an integrating capacitor 10. With respect to the source of direct current, the two circuits shown for biasing the diodes 5 and 6 are connected in parallel. One biasing circuit connected to source 7 includes resistor 8 connected in series with diode 5 and the other circuit includes resistor 9 connected in series with diode 6. Resistors 8 and 9 have relatively high resistances and may be of equal value. These circuits provide substantially constant current flow in the forward direction through each diode. Capacitor 10 is connected in series with the biased diodes, and the series circuit is connected across an error signal source 1.

Relatively slow changes in voltage at the error signal source will produce an uninterrupted flow of current through diodes 5 and 6 to produce a voltage change on capacitor 10. This voltage change may be applied to a controlled system, for example, a servo system for operating control surfaces of aircraft. However, for rapid voltage changes at the error signal source, the current flow to capacitor 10 is limited to a value that is approximately equal to a predetermined quiescent current flow which is applied through either one of the diodes 5, 6 from the constant voltage source 7. For example, when conductor 11 of the input circuit becomes rapidly more positive with respect to conductor 12, the current for charging capacitor 10 is added to the biasing current which flows through diode 5, but is opposed to the biasing current which flows through diode 6. When the opposing charging current through diode 6 reaches approximately the same value as the biasing current, the resistance of the diode increases rapidly to limit the current flow and therefore to limit the rate of voltage change across capacitor 10. In a like manner, when the charging current flows in a reverse direction, diode 5 limits the current flow to a value equal to its biasing current.

The limiting action of the circuit may be expressed briefly in mathematical form by the following equation. It is assumed that the impedance in the output circuit (resistor 4) is sufficiently high to have little effect on the instantaneous charge of capacitor 10.

Let $e_0$=instantaneous voltage across capacitor 10,
C=capacitance of capacitor 10,
$i_c$=charging current to capacitor 10,
$t$=time, and $K$=a constant.

Then $$e_o=\frac{1}{C}\int_o^t i_c dt+K$$

From differentiating this equation, the rate of change of $e_0$ is found to be $$\frac{de_o}{dt}=\frac{i_c}{C}$$

where $i_c$ is always less than the biasing current for each diode.

Although this invention has been described with reference to a particular circuit, the circuit may be modified by those skilled in the art and still be within the scope of the appended claims. For example, a power supply and a pentode tube arranged as a constant direct current source may be substituted for battery 7 and resistors 8 and 9. The diodes may be either dry disc or tube types. The diodes and their biasing circuit together may be considered to be a non-linear element which passes current readily in either direction until a certain current flow is obtained. As a desired maximum current flow is reached the resistance of the circuit increases sharply to prevent further increase in current.

I claim:

A current rate limiting circuit comprising, first and second diodes connected serially in a mutually inverse sense, a biasing circuit comprising first and second impedance elements connected in series and a source of direct-current voltage, said serially connected impedance elements being connected across said serially connected diodes, said source of direct-current voltage being connected between the junction of said diodes and the junction of said impedance elements for producing a predetermined current flow in a forward conducting sense through each of said diodes, a source of variable signal and an integrating capacitor connected in series with the combination of said serially connected diodes and said impedance elements, and an output circuit connected in parallel with said capacitor, whereby the maximum current flow to said parallel capacitor and output circuit is limited substantially to said predetermined current flow through said diodes.

References Cited in the file of this patent

UNITED STATES PATENTS

| | | |
|---|---|---|
| 2,248,267 | Bacon | July 8, 1941 |
| 2,281,395 | Travis | Apr. 28, 1942 |
| 2,418,389 | Andresen | Apr. 1, 1947 |
| 2,730,615 | Mantz | Jan. 10, 1956 |